(12) United States Patent
Pizzey

(10) Patent No.: US 7,048,960 B2
(45) Date of Patent: May 23, 2006

(54) HIGH LIGNAN FLAXSEED PRODUCT AND PRODUCT BY PROCESS

(76) Inventor: Glenn Roy Pizzey, Box 132 of the Rural Municipality of Silver Creek, Angusville, Manitoba (CA) R0J 0A0

( * ) Notice: Subject to any disclaimer, the term of this patent is extended or adjusted under 35 U.S.C. 154(b) by 384 days.

(21) Appl. No.: 10/395,554

(22) Filed: Mar. 24, 2003

(65) Prior Publication Data

US 2003/0180436 A1 Sep. 25, 2003

Related U.S. Application Data

(60) Provisional application No. 60/366,268, filed on Mar. 22, 2002.

(51) Int. Cl.
*A23L 1/10* (2006.01)
(52) U.S. Cl. ..................... 426/629; 426/478; 426/516; 426/521
(58) Field of Classification Search ............... 426/629, 426/478, 521, 516
See application file for complete search history.

(56) References Cited

U.S. PATENT DOCUMENTS

| | | | |
|---|---|---|---|
| 4,325,882 A | 4/1982 | Reiners .................... 260/412.4 |
| 5,085,175 A * | 2/1992 | Clements et al. ........... 119/171 |
| 5,408,924 A | 4/1995 | Arendt et al. ................. 99/516 |
| 5,466,188 A | 11/1995 | Schaal et al. ................. 460/24 |
| 5,705,618 A | 1/1998 | Westcott et al. ............ 530/500 |
| 5,846,944 A | 12/1998 | Prasad ......................... 514/25 |
| 5,925,401 A | 7/1999 | Kankaanpää-Anttila et al. .......................... 426/656 |
| 6,261,565 B1 | 7/2001 | Empie et al. ............ 424/195.1 |
| 6,264,853 B1 | 7/2001 | Westcott et al. ................ 252/1 |
| 6,368,650 B1 | 4/2002 | Pizzey ......................... 426/518 |
| 6,391,308 B1 | 5/2002 | Empie et al. ............ 424/195.1 |
| 6,391,309 B1 | 5/2002 | Empie et al. ............ 424/195.1 |
| 6,391,310 B1 | 5/2002 | Empie et al. ............ 424/195.1 |
| 6,395,279 B1 | 5/2002 | Empie et al. ............ 424/195.1 |
| 6,399,072 B1 | 6/2002 | Empie et al. ............ 424/195.1 |
| 6,440,479 B1 | 8/2002 | Myllymäki ................. 426/483 |
| 6,451,849 B1 | 9/2002 | Ahotupa et al. ............ 514/473 |
| 6,486,126 B1 | 11/2002 | Prasad ......................... 514/25 |
| 6,498,145 B1 | 12/2002 | Prasad ......................... 514/25 |
| 6,509,381 B1 | 1/2003 | Empie et al. ............... 514/783 |
| 6,518,319 B1 | 2/2003 | Empie et al. ............... 514/783 |
| 6,673,773 B1 | 1/2004 | Prasad ......................... 514/25 |
| 6,689,809 B1 | 2/2004 | Ahotupa et al. ............ 514/473 |
| 6,767,565 B1 | 7/2004 | Shukla et al. ............... 424/768 |
| 6,806,356 B1 | 10/2004 | Dobbins et al. ............ 530/500 |
| 2001/0016590 A1 | 8/2001 | Ahotupa et al. ............ 514/310 |
| 2002/0061854 A1 | 5/2002 | Ahotupa et al. .............. 514/22 |
| 2002/0168433 A1 | 11/2002 | Empie et al. ............... 424/757 |
| 2003/0003168 A1 | 1/2003 | Empie et al. ............... 424/757 |
| 2003/0055227 A1 | 3/2003 | Shukla et al. ............... 530/507 |
| 2003/0060420 A1 | 3/2003 | Heintzman et al. ........... 514/22 |
| 2003/0064938 A1 | 4/2003 | Empie et al. ................. 514/27 |
| 2003/0131737 A1 | 7/2003 | Cui et al. ..................... 99/519 |
| 2003/0136276 A1 | 7/2003 | Cui et al. ..................... 99/519 |
| 2003/0165607 A1 | 9/2003 | Sipila ......................... 426/601 |
| 2003/0212007 A1 | 11/2003 | Prasad ......................... 514/25 |
| 2003/0216553 A1 | 11/2003 | Dobbins et al. ............ 530/500 |
| 2004/0034241 A1 | 2/2004 | Empie et al. ............... 552/540 |
| 2004/0048804 A1 | 3/2004 | Ahotupa et al. .............. 514/22 |
| 2004/0224902 A1 | 11/2004 | Shukla et al. ................. 514/22 |

FOREIGN PATENT DOCUMENTS

| | | |
|---|---|---|
| CA | 2167951 C | 7/1997 |
| EP | 0389631 A1 | 10/1990 |
| EP | 1466609 A1 | 10/2004 |
| EP | 1471070 A1 | 10/2004 |
| EP | 1477178 A2 | 11/2004 |
| JP | 63119657 * | 5/1988 |
| WO | WO 96/30468 | 10/1996 |
| WO | WO 97/14670 | 4/1997 |
| WO | WO 00/19842 | 4/2000 |
| WO | WO 2004/010965 | 2/2004 |
| WO | WO 2004/012697 | 2/2004 |

OTHER PUBLICATIONS

LinumLife Webpage; Home. http://www.linumlife.com/common.asp?id=89&instantie=0&cmtSessie=; © 2003.
LinumLife Webpage; LinumLife EXTRA. http://www.linumlife.com/common.asp?id=184&instantie=0 &cmtSessie=; © 2003.
LinumLife Webpage; LinumLife for manufacturers. http://www.linumlife.com/common.asp?id=2256; © 2003.
LinumLife Webpage; LinumLife srticles. http://www.linumlife.com/common.asp?id=2242&instantie=0 &cmtSessie=; © 2003.

* cited by examiner

*Primary Examiner*—Helen Pratt
(74) *Attorney, Agent, or Firm*—Winston & Strawn LLP

(57) ABSTRACT

The present invention includes a high lignan concentrate (3% to 5% or greater) flax seed product, and product by process, which can be produced by 1) supplying a uniformly colored quantity of flax seeds with less than 5 percent visually darker seeds; 2) milling the selected seeds of a visually uniform color; 3) sifting the milled selected seeds into a second portion and a third portion using a preferred screen size from US# 12 up to an including US #18; 4) selecting the coarser fraction of the sifted, milled flax meal and aspirating it into a fourth lighter density portion and a fifth coarser portion, wherein the fourth lighter portion contains the valuable high lignan concentrate. As an added advantage, the high lignan flax seed meal can include approximately 40–50% insoluble dietary fiber and 50–60% soluble dietary fiber.

26 Claims, No Drawings

HIGH LIGNAN FLAXSEED PRODUCT AND PRODUCT BY PROCESS

The instant application is a continuation of U.S. Pat. Ser. No. 60/366,268, filed Mar. 22, 2002, now abandoned.

FIELD OF THE INVENTION

The present invention relates to the field of flax seed processed meals, and more particularly those processes which create a very high lignan flax seed meal.

BACKGROUND OF THE INVENTION

Flax seeds are flat, oval and pointed at one end. They contain a seed coating, an embryo comprising two large, flattened cotyledons, a short hypocotyl and a radical. The seed coating in flax seed is formed from the ovule and has five layers, two of which are the most important. These two layers consist of the epidermal layer, commonly called the mucilage layer, and the testa which consists of pigmented cells which determine the seed's coloring. The cotyledon forms 55% of the seed, whereas the seed coat and the endosperm comprise 36% of the seed, while the embryo axis comprises 4% of the seed's total weight.

Typically, various abrasion methods have been implemented in husking. The oil of the flax seed may be separated by pressing or extracting it from the whole grain. Flax seed has been cultivated in Canada and the USA primarily for oil. The solid residue has been typically used as an animal feed.

Full fat milled seed is defined as the product milled by any suitable milling process including grinding and impact techniques where the whole seed is milled without any prior extraction of oil or other components.

Defatted flax meal refers to flax meal made from flax seeds from which the oil has been extracted therefrom.

One of the major benefits of processing flax seeds into a nutritional supplement for humans is the fact that they contain lignans in an amount of 0.7 percent to 1.5 percent. High lignan processed flax seeds are believed to hold special pharmaceutical benefits inasmuch as they exhibit broad biological activities, including antitumor, antioxidant, antiviral and estrogenic and antiestrogenic activities. The lignans are generally cinnamic acid dimers containing a dibenzylbutane skeleton. The primary lignan found in flax seed is secoisolariciresinol diglycoside (SDG). Other benefits include the fact that it is a rich source of essential fatty acids.

In the past, lignan concentrations in flax seed were exhibited far less than 3%. In such concentrations, the pharmaceutical applications were more limited and flax seed products were not typically used for antitumor, antiviral, estrogenic and antiestrogenic purposes. It should be noted that in the past, defatted flax seed meals typically contained less than 3 percent lignans.

SUMMARY OF THE INVENTION

The present invention consists of a method and product by method for producing high lignan flax seed meal. The flax product created from the present inventive process may be made from either flax seed or defatted flax meal, which has elevated lignan concentrations and soluble dietary fiber concentrations. In the inventive process, flax seeds are selected by a process essentially consisting of selecting portions of flax seeds such that uniformly colored seeds are selected and product with 5% or more of the visually darker flax seeds are deselected. Such a method is completely disclosed in U.S. Pat. No. 6,368,750, issued to Glenn Roy Pizzey on Apr. 9, 2002, and which is incorporated by reference hereto within the present patent application.

The hulls are then milled or separated from the seeds such that the hulls still retain mucilage, lignans and antioxidants. The selected milled product is then sifted into two fractions by using screens having aperture sizes of US #12, US #14, US #16 or US #18. The larger the screen size, the more selected product is produced. Typically, from 1 percent to 5 percent yield is obtained from this screening process.

The next step is to take the coarse fraction and further process it by aspiration, which is a process well known in the relevant art of grain processing and is not further described herein. From this process the resultant product is again separated into two fractions, with the first being lighter in density than the second fraction. The second fraction is denser and more angular. The first fraction has the preferred high lignan content, which is the inventive product by process. This first product may be sold as is, or it may be further extruded and then sold commercially.

Nonetheless, the resultant products has a lignan content not seen before in the prior art, that is a lignan concentration of 3%, 4%, 5%, 6%, 7% or even greater, enabling it to have a much wider use for dietary supplements and pharmaceutical products and preparations, and especially such usages as antiviral, antitumor, antioxidant, estrogenic and antiextrogenic activities.

OBJECTS OF THE INVENTION

Thus, it is one primary object of the present invention to provide a product by process that may attain greatly elevated lignan concentrations of 3%, 4%, 5% or even greater by supplying a quantity of uniformly colored flax seeds containing 5% or less of the visually darker seeds, then milling the selected seeds, then sifting the milled product and selecting the darker coarser portion, then aspirating the selected milled product and then reselecting the lighter density product which has the improved higher lignan content.

Another primary object of the present invention is to provide a product by process which may attain an improved ratio of soluble dietary fiber to insoluble dietary fiber by supplying a quantity of uniformly colored flax seeds containing 5% of less of the visually darker seeds, then milling the selected product, then sifting the milled product and selecting the darker coarser portion, then aspirating the selected milled product and then reselecting the lighter density product which has the improved higher lignan content.

Yet a further object of the present invention is to provide an improved processing method and resultant product by supplying a quantity of uniformly colored flax seeds containing 5% or less of the visually darker seeds, then milling the selected seeds, then sifting the milled product and selecting the coarser portion, then aspirating the selected milled product, then reselecting the lighter density product which has the improved higher lignan content and then extruding the reselected lighter, higher lignan product.

Still an additional object of the present invention is to provide a product by process that may attain greatly elevated lignan concentrations of 3%, 4%, 5%, 6%, 7% or even greater by supplying a quantity of uniformly colored flax seeds containing 5% or less of the visually darker seeds, then milling the selected product, then sifting the milled product and selecting the coarser portion, then aspirating the selected milled product and then reselecting the lighter density product which is improved in that it has a total dietary fiber comprising 40–50% insoluble dietary fiber and 50–60% soluble dietary fiber.

These and other objects and advantages of the present invention can be readily derived from the following detailed description of the present invention and should be considered as within the overall scope of the invention.

DETAILED DESCRIPTION OF INVENTIVE PROCESS AND PRODUCT BY PROCESS

In the present inventive process, flax seeds are selected by a process essentially consisting of providing a quantity of flax seeds, selecting portions of the flax seeds such that the uniformly colored seeds are selected and product with no more than 5% of the visually darker product is retained in the mix. As noted above, such a method is fully disclosed in U.S. Pat. No. 6,368,650 issued to Glenn Roy Pizzey on Apr. 9, 2002, and which is incorporated by reference hereto.

The visually uniformly colored seeds are then milled or hulls are separated from the seeds such that the hulls still retain mucilage, lignans and antioxidants. This particular milled product is then sifted into two portions by using screens with apertures sizes of US #12, US #14, US #16 or US #18. The larger the aperture mesh selected, the greater the process yield. Typically, from one percent to five percent is obtained from such a product.

The resultant coarser portion is then further processed by aspiration, a procedure well known in the relevant art and which is not further disclosed herein. From the aspiration process, the aspiration product is again divided into two portions, wherein the first portion is lighter in density, while the second is heavier and more coarse. It is the first fraction which as has the higher or preferred high lignan content which is the inventive product. This particular product may be used as is, or it may be further extruded, depending upon the particular application which it will be used in.

When the hulls are extruded, this is accomplished with a X-20 Wenger, Spiral ribbed single screw extruder, or other preferred similar extruders may be utilized. No preconditioning is necessary for use with the extruder. The hulls are fed through the extruder dry, although at the beginning of the run, drops of ambient, distilled water are dripped into the barrel. This sufficiently lubricates the barrel to facilitate the feeding of the hull into the extruding device. After material reaches the end of the die, then the addition of distilled water into the barrel is no longer necessary. The material creates its own sheer and thus heat. The barrel is jacketed and cooling water is circulated through for the entire duration of the extrusion. The first four sections of the barrel are cooled constantly. The cooling jacket on the die end is only utilized when the temperature exceeds 105° C. It is preferable to avoid further temperature increases. A high die temperature creates a very hard product, which may plug the die holes. However, it is necessary to maintain some heat because it facilitates material movement through the extruder.

Although dies with two holes have been typically used in the inventive process, there is no reason to believe that dies with additional holes would not adequately function to accomplish the task at hand. Extruded product has not been dried or tested for moisture. Moisture need not be tested at the beginning of the extrusion process. A higher oil content of the hull can cause surging.

The size or shape of the extruded pellets is not an important factor inasmuch as the resultant product may later be ground to the preferred size. For example, a food fortification application may require a mesh size of approximately 30 mesh, whereas a dietary supplement tablet application may require an 80 mesh size. Various grinders can be used for preparing the product; however, mesh sizes finer than 40 mesh may require cryogenic pre-cooling.

It may be noted that the lignan concentration of the flax seed product of the present invention was determined using a novel method developed by the inventor and Alpha Laboratories, 1365 Redwood Way, Petaluma, Calif. The method comprises hydrolizing flax seed hulls directly using 0.3–2N NaOH followed by HPLC analysis and UV diode array detection at 281 nm.

It should be noted that an important aspect of the present inventive process is that extrusion lowers the microbial counts without any impairment of stability of the end product. The resultant product exhibits stability for up to one full year. Extrusion of the hull material creates mechanical sheer, which produces heat and thus pasteurization.

An additional feature of the present inventive process and product by process is that the flax product produced contains a higher ratio of soluble dietary fiber to insoluble dietary fiber than full fat milled flaxseed. Specifically, in prior art flax meals, total dietary fiber in flax meal consists typically of 60–70% insoluble dietary fiber to 30–40% soluble dietary fiber. However, the flax product described herein has approximately 40–50% insoluble dietary fiber and 50–60% soluble dietary fiber.

It is further of note that the inventive flax seed product has antioxidant activity of typically 15,000 to 40,000 TE (Trolox Equivalents) per 100 grams. As shown below, this is significantly higher than the antioxidant activity of other foods considered to be high in antioxidant activity.

| Food | Antioxidant activity (TE/100 grams) |
| --- | --- |
| Flax Product | 40,000 |
| Red Grapes | 1,350 |
| Red Cabbage | 1000 |
| Broccoli Flowers | 500 |
| Spinach | 500 |
| Green Grapes | 400 |
| Tomato | 300 |
| Green Beans | 175 |
| Lima Beans | 1,055 |
| Red Beans | 11,459 |
| Blueberries | 3,300 |
| Raisins | 5,900 |
| Wheat Bran | 4,620 |
| Wheat Flour (refined) | 600 |

As discussed above, the flax product may be used in many applications, for example, but by no means limited to, a specialty animal feed, dietary supplement, food additive, functional food product, nutraceuticol, and the like.

| | Min % | Max % | Typical % |
| --- | --- | --- | --- |
| Moisture | 3 | 13 | 11.5 |
| Protein | 6.5 | 7.5 | 7.0 |
| Dietary Fiber | 50 | 60 | 56 |
| Soluble Dietary Fiber | 25 | 35 | 30 |
| Insoluble Dietary Fiber | 22 | 29 | 25 |
| Carbohydrate | 62 | 66 | 64 |
| Fat (AOAC 996.06) | 10 | 15 | 12.5 |
| Polyunsaturates | 7 | 10 | 8.5 |
| Linolenic Acid | 6 | 8 | 7 |
| Linoleic Acid | 1 | 2.5 | 2 |
| Monosaturates | 1.5 | 2.5 | 2 |
| Saturates | 1 | 2 | 1.5 |
| Lignans | 5 | 7 | 5.5 |

Accordingly, a new inventive process is created and a product by process is disclosed herein which dramatically increased the lignan content of processed flax seed product by as much as 3%, 4%, 5%, 6%, 7% or even greater.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A flax product comprising a lignan component, a fiber component, and a fat component, wherein the lignan component concentration is greater than 3 weight percent based on the total flax product.

2. The flax product according to claim 1, wherein the concentration of the lignans is greater than 4 weight percent.

3. The flax product according to claim 1, wherein the concentration of the lignans is greater than 5 weight percent.

4. The flax product according to claim 1, wherein the concentration of the lignans is greater than 6 weight percent.

5. The flax product according to claim 1, wherein the concentration of the lignans is greater than 7 weight percent.

6. The flax product according to claim 1 having a total dietary fiber comprising 40–50% insoluble dietary fiber and 50–60% soluble dietary fiber.

7. The flax product according to claim 1 having an antioxidant activity of 15,000 to 40,000 TE per 100 grams.

8. The flax product according to claim 1 produced by the process of:
    providing a quantity of flax seeds;
    selecting a visually uniformly colored first portion of flax seeds by deselecting a second portion of the flax seeds which contains a visually distinguishable darker color in a quantity of 5% or more;
    milling the first selected visually uniformly colored portion;
    sifting the milled seeds into a third portion which is lighter in density and coarser, and a fourth portion which is denser and finer in granularity;
    aspirating the coarser portion into a fifth lighter density portion and a sixth denser portion;
    wherein the fifth portion has the desired improved high lignan content.

9. The flax product by process according to of claim 8 wherein the process of sifting the first portion into a third and forth portion is accomplished by the use of a mesh screen of a screen size from substantially US #12 to US #18.

10. The flax product of claim 1, wherein the fat component is present in an amount of 10 to 15 weight percent of the total flax product.

11. An extruded flax product comprising the flax product of claim 1.

12. The flax product of claim 1, wherein the dietary fiber component comprises soluble dietary fibers in an amount of 25 to 35 weight percent of the total flax product.

13. The flax product of claim 1, wherein the moisture content is present in an amount of greater than 3 to 13 weight percent of the total flax product.

14. The flax product of claim 1, wherein the fat component is present in an amount of at least 10 weight percent of the total flax product.

15. A flax product comprising a lignan component, a fiber component, and a fat component, wherein the lignan component concentration is greater than 3 weight percent based on the total flax product and the flax product is produced by the process of:
    providing a quantity of flax seeds;
    selecting a visually uniformly colored first portion of flax seeds by deselecting a second portion of the flax seeds which contains a visually distinguishable darker color in a quantity of 5% or more;
    milling the first selected visually uniformly colored portion;
    sifting the milled seeds into a third portion which is lighter in density and coarser, and a fourth portion which is denser and finer in granularity;
    aspirating the coarser portion into a fifth lighter density portion and a sixth denser portion;
    wherein the fifth portion has the desired improved high lignan content, and wherein the fifth high lignan portion is further processed by extrusion.

16. The flax product of claim 15, wherein the extrusion is sufficient to both pasteurize and increase the bulk density of the flax product.

17. A method of increasing the lignan content in a flax product which comprises:
    providing a plurality of flax seeds having a hull portion and a seed portion;
    separating a plurality of the hull portions from the seed portions; and
    extruding the flax seed hull portions in an extrusion zone, to provide an increased lignan flax product.

18. The method of claim 17, wherein the extruding comprises adding sufficient water to the extrusion zone to facilitate lubrication and flow of the flax seed hull portions therethrough.

19. The method of claim 17, wherein the extrusion zone is maintained at a temperature of no higher than 105° C. to minimize inhibition of the flax product flow.

20. The method of claim 17, wherein the extrusion is at a temperature and for a duration sufficient to detectably decrease an amount of microbes in the flax seed hull portions without decreasing the stability thereof.

21. The method of claim 17, wherein the extrusion produces shelf stability of the flax product to one year.

22. The method of claim 17, wherein the separating removes the hull portions so as to retain a portion of the mucilage, lignans, and antioxidants therewith.

23. The method of claim 17, wherein the hull portions are directly separated from the seed portions after providing the plurality of flax seeds.

24. The method of claim 17, further comprising adding a lubricant consisting essentially of water during the extrusion and after the separating.

25. The method of claim 17, wherein the extrusion is sufficient to both pasteurize and increase the bulk density of the flax product.

26. A method of increasing the lignan content in a flax product which comprises:
    providing a plurality of flax seeds having a hull portion and a seed portion;
    separating a plurality of the hull portions from the seed portions; and
    extruding a feed stock consisting essentially of the hull portions and water in an extrusion zone, to provide an increased lignan flax product.

* * * * *

UNITED STATES PATENT AND TRADEMARK OFFICE
CERTIFICATE OF CORRECTION

PATENT NO.         : 7,048,960 B2
APPLICATION NO. : 10/395554
DATED                 : May 23, 2006
INVENTOR(S)       : Pizzey It is certified that error appears in the above-identified patent and that said Letters Patent is hereby corrected as shown below:

Title Page:
Item [57] ABSTRACT, line 8, after "screen size from US#12 up to" delete "an" and insert -- and --.

Column 2:
Line 1, delete "6,368,750" and insert -- 6,368,650 --.

Column 3:
Line 18, delete "6,368,650issue" and insert -- 6,368,650 issued --.
Line 34, after "which" delete "as".

Column 4:
After line 51, and before the table, insert the following:
-- The following is a Chemical Analysis of the present Flax Product
   Energy 295 cal/100g --.

Column 5:
Line 47 (claim 9, line 1), before "claim 8" delete "of".
Line 49 (claim 9, line 3), delete "forth" and insert -- fourth --.

Signed and Sealed this

Sixth Day of March, 2007

JON W. DUDAS
*Director of the United States Patent and Trademark Office*